(12) United States Patent
Khair et al.

(10) Patent No.: US 7,739,869 B2
(45) Date of Patent: Jun. 22, 2010

(54) DIESEL PARTICULATE FILTER PERFORMANCE USING SONIC PARTICLE AGGLOMERATION

(75) Inventors: Magdi Kaiser Khair, San Antonio, TX (US); Martin B. Treuhaft, San Antonio, TX (US); Imad S. Abdul-Khalek, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 623 days.

(21) Appl. No.: 11/680,326

(22) Filed: Feb. 28, 2007

(65) Prior Publication Data

US 2007/0227128 A1 Oct. 4, 2007

Related U.S. Application Data

(60) Provisional application No. 60/777,600, filed on Feb. 28, 2006.

(51) Int. Cl.
*F01N 3/00* (2006.01)
(52) U.S. Cl. .............. 60/297; 60/274; 60/275; 60/312; 95/29; 96/175; 96/389
(58) Field of Classification Search ........... 60/274, 60/275, 297, 311, 312; 96/175, 389, FOR. 173; 55/385.3; 95/29, 30
See application file for complete search history.

(56) References Cited

U.S. PATENT DOCUMENTS

| | | | |
|---|---|---|---|
| 3,763,634 A | 10/1973 | Alliger | 55/223 |
| 4,307,964 A | 12/1981 | Dudgeon et al. | 366/127 |
| 4,319,891 A | 3/1982 | Anderson et al. | 55/15 |
| 4,376,637 A * | 3/1983 | Yang | 95/74 |
| 4,378,976 A | 4/1983 | Rush | 55/15 |
| 5,197,399 A | 3/1993 | Mansour | 110/345 |
| 5,353,721 A | 10/1994 | Mansour et al. | 110/345 |
| 5,419,877 A * | 5/1995 | Goforth et al. | 422/177 |
| 5,626,767 A * | 5/1997 | Trampler et al. | 210/748 |
| 5,688,405 A * | 11/1997 | Dickinson et al. | 210/748 |
| 5,769,913 A | 6/1998 | Gallego Juarez et al. | 55/277 |
| 6,224,652 B1 | 5/2001 | Caperan et al. | 95/29 |
| 6,447,574 B1 | 9/2002 | Frier, Jr. et al. | 95/29 |
| 6,467,350 B1 * | 10/2002 | Kaduchak et al. | 73/570.5 |
| 6,732,510 B2 * | 5/2004 | Ciray | 60/312 |
| 6,749,666 B2 | 6/2004 | Meegan, Jr. | 95/29 |
| 7,174,707 B2 * | 2/2007 | Megas et al. | 60/297 |
| 7,594,953 B2 * | 9/2009 | Clem | 95/29 |
| 2004/0221572 A1 | 11/2004 | Treiber | 60/297 |
| 2004/0226437 A1 * | 11/2004 | Stenersen et al. | 95/29 |

FOREIGN PATENT DOCUMENTS

GB 2362115 11/2001
JP 2005232969 A 2/2007

OTHER PUBLICATIONS

International Search Report with Written Opinion, PCT/US2007/062967, 10 pages, Oct. 12, 2007.
A. Rankin; "Scientists Use Sound to Clean"; Albuquerque Journal; Journal North, 2 pages, Nov. 10, 2003.
International Preliminary Report on Patentability PCT/US2007/062967, 6 pages, Sep. 12, 2008.

* cited by examiner

*Primary Examiner*—Tu M Nguyen
(74) *Attorney, Agent, or Firm*—Chowdhury & Georgakis PC

(57) ABSTRACT

A method and system for improving the performance of diesel particulate filters. Before entering the filter, the exhaust gas is subjected to sonic waves to agglomerate the particles.

15 Claims, 2 Drawing Sheets

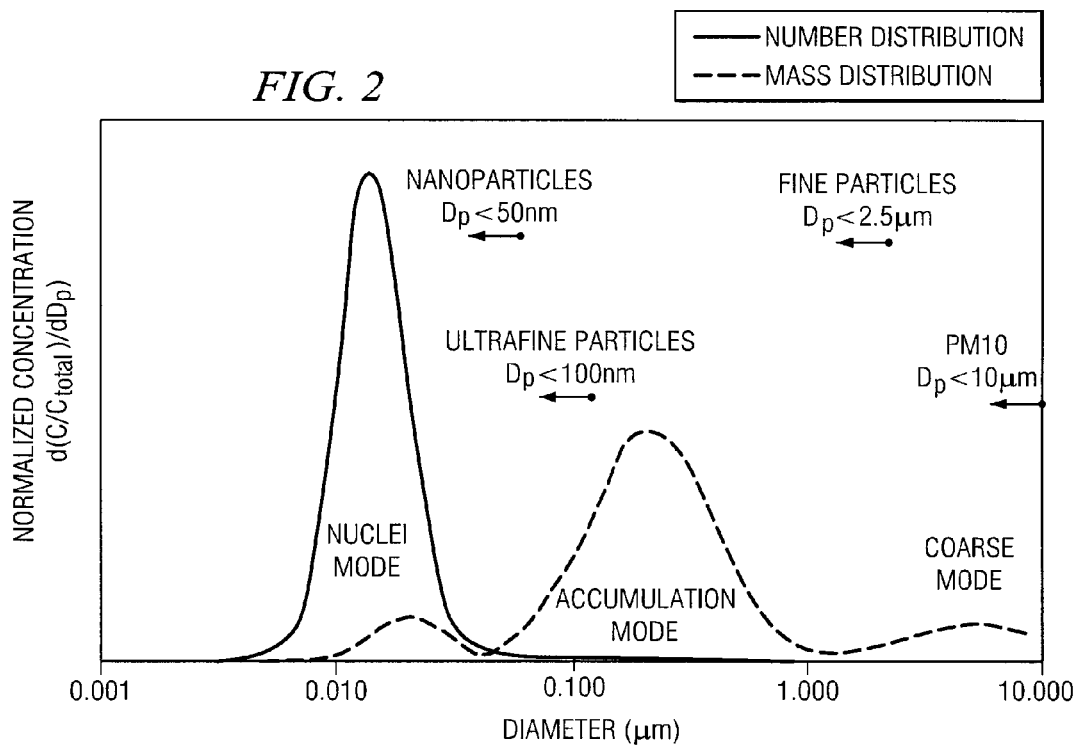
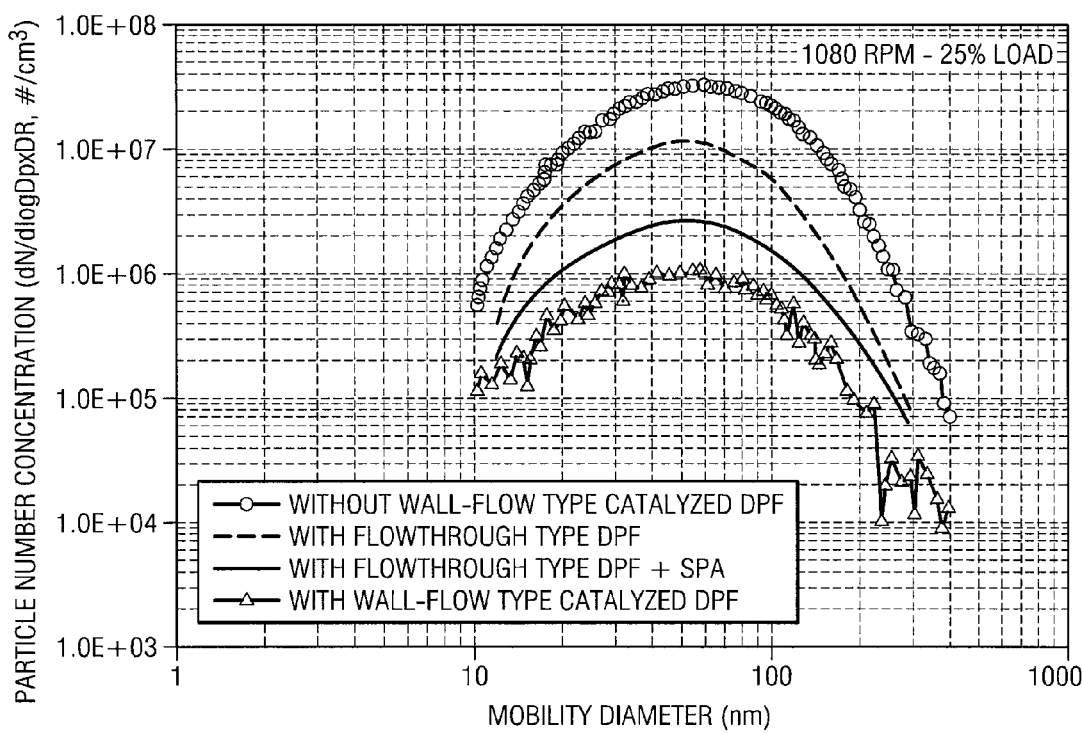

DIESEL PARTICULATE FILTER PERFORMANCE USING SONIC PARTICLE AGGLOMERATION

RELATED PATENT APPLICATION

This application claims the benefit of U.S. Provisional Application No. 60/777,600, filed Feb. 28, 2006 and entitled "Improved Diesel Particulate Filter Performance Using Sonic Particle Agglomeration."

TECHNICAL FIELD OF THE INVENTION

This invention relates to reduction of emissions from diesel engines, and more particularly to improving the performance of diesel particulate filters.

BACKGROUND OF THE INVENTION

Internal combustion engines used for mobile or stationary applications are currently subject to strict emission limits. In-cylinder design changes have fallen short of allowing these engines to meet these emissions limits. Technology advances in the catalyst field have made it possible for integrated systems of engine and exhaust treatment to achieve extremely low emissions. Even so, more emission reduction efficiencies are sought from existing systems and new catalytic reduction solutions are needed to achieve even lower emissions.

In diesel engines, especially those that are classified as heavy-duty, gaseous emissions of unburned hydrocarbon and carbon monoxide are extremely low due to the lean burn nature of diffusion combustion. However, both nitric oxide and particulate matter emissions present a challenge to engineers. The challenge for catalytically treating and reducing nitric oxide is presented due to the excess oxygen in the exhaust of a typical diesel engine. The challenge of reducing particulate matter results from the nature of diffusion combustion. In spite of the recent advances in combustion technology, diesel engines are now requiring particulate filters to satisfy regulations.

Filtration of diesel particulate matter is achieved at a high efficiency rate (over 90 percent) when the exhaust is allowed to pass through porous media such as in ceramic cordierite filters (wallflow). However, a penalty associated with such high filtration efficiency is high exhaust system restriction. This exhaust restriction increases as trapping continues, and generally adversely impacts engine performance and fuel economy.

Recent work by some filter system manufacturers has resulted in filters that are characterized by "flowthrough" exhaust. As compared to wallflow filters, flowthrough filters have less exhaust restriction, but are also less efficient.

BRIEF DESCRIPTION OF THE DRAWINGS

FIG. 2 illustrates particle agglomeration using the system of FIG. 1.

FIG. 3 is an example of how DPF efficiency is improved using the system of FIG. 1.

DETAILED DESCRIPTION OF THE INVENTION

Figure 1:
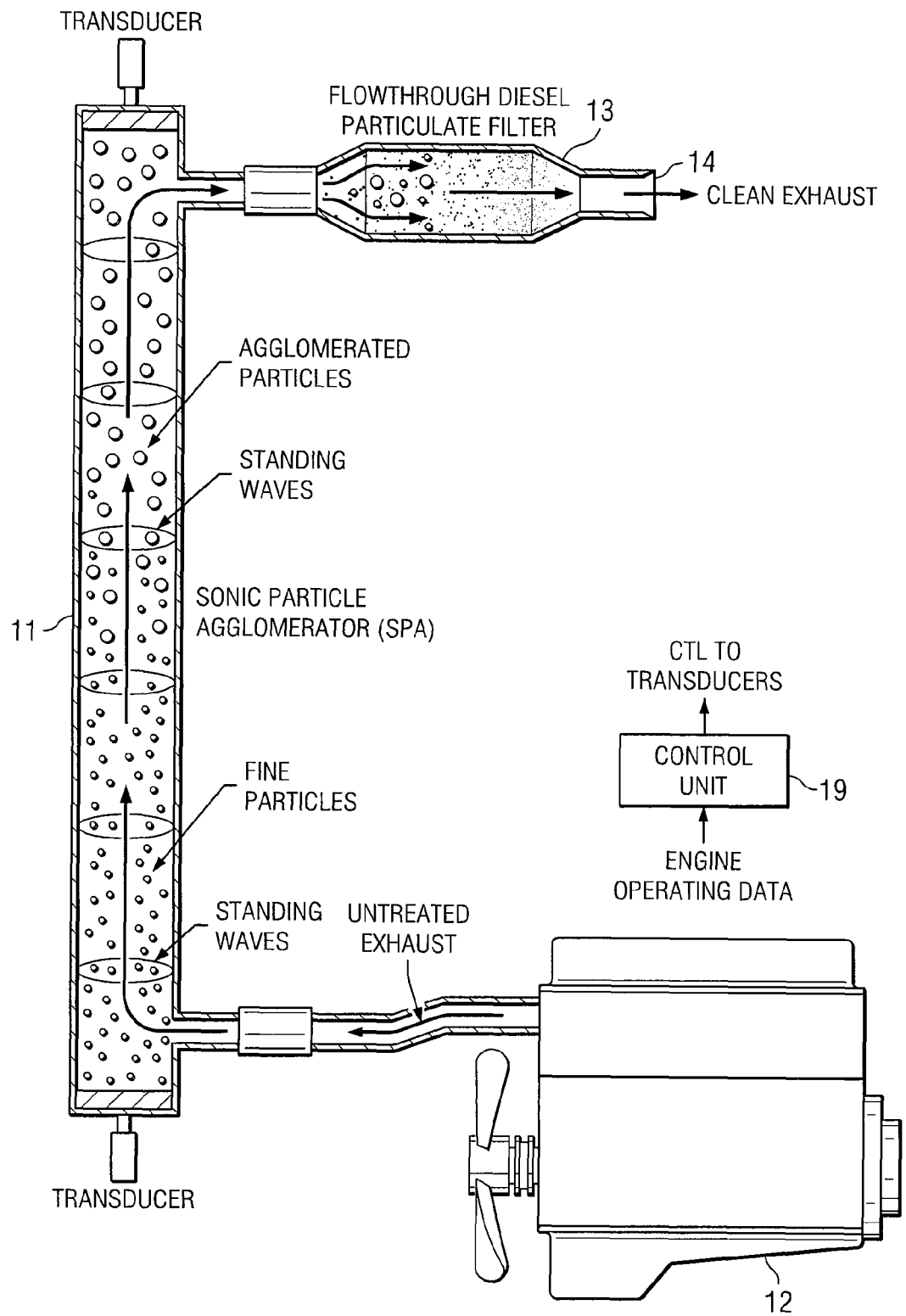
FIG. 1 illustrates a particle-agglomerated DPF system in accordance with the invention.

As stated in the Background, an advantage of flowthrough diesel particulate filters (DPF's) is their low back pressure characteristic. This characteristic is a result of the fact that DPF's cause less restriction to engine exhaust. It follows that they do not present the same adverse impact on engine performance or fuel economy as do wallflow DPF's.

On the other hand, the filtration efficiency of flowthrough DPF's is rather low (about 50 percent). This fact has limited the application of flowthrough DPF's to either retrofit applications or to vehicles that must meet only less stringent European particulate emissions standards.

To meet European standards, it is customary for engine manufacturers to advance injection timing. This increases engine-out nitric oxide emissions, but reduces engine-out particulate matter emissions. The reductions in particulate emissions are usually sufficient to allow the use of flowthrough DPF's despite their reduced efficiency. Increases in nitric oxide emissions may be handled by urea-selective catalytic reduction devices. Using this approach to emissions control, the vehicle manufacturer offers an improved fuel economy due to the advanced injection timing as well as the lower back pressure filter characteristic.

The following description is directed to improving the filtration efficiency of DPF's by using a standing sound wave particle agglomerator upstream from the DPF. For purposes of description, this concept is described for use with an automotive diesel internal combustion engine. However, the same concepts may be applied to any engine having particulate emissions.

Also, the invention is described in terms of use with a "flow-through" type DPF. A flow-through filter typically consists of thin metal foils with targeted flow control technology across and through the foils. The particles are separated from the exhaust gas and deposited on the inner surface of the filter. Because the exhaust gas does not need to permeate a wall, the degree of filtration is lower than with that of a wall-flow filter.

However, the same concepts could be applied to any DPF, that is, any filter used to remove particulate matter from exhaust gas of an engine, whose function is improved with particle agglomeration. "Wallflow" type devices are characterized by confronting the exhaust with a "wall" of cores that have had alternate channels plugged. The plugs force the exhaust gas to flow through the wall, and the particulate collects on the inlet face. Variations on the above-described DPFs and other DPF types are available, such as DPF's using sintered metal plates, foamed metal structures, fiber mats and other materials as the filtration medium.

In other terminology, diesel particulate filtering has been described in terms of having at least two modes of operation: wall-flow filters (also called closed system filtering) where the exhaust gas permeates a porous wall in the filter, and flow-through filters (also called open system filtering) where the exhaust gas flows through the filter.

FIG. 1 is a schematic representation of a particle-agglomerated DPF exhaust treatment system 10 in accordance with the invention. The system 10 is shown as part of an exhaust system having only particulate matter filtering. In other embodiments, system 10 could include additional filtering, oxidizing, or other exhaust treatment devices, either upstream or downstream of system 10.

The operating principle of system 10 relates to growing the size of particles floating in the exhaust of a diesel engine. In so doing, particulate matter will consist of larger particles that are easier to filter rather than finer particles that would escape through the filter.

In accordance with this principle of operation, an ultrasonic wave field generating device 11 is placed in the exhaust stream. Here, device 11 is identified as a sonic particle agglomerator (SPA) 11. It is a closed cylinder or other tube-like structure placed in-line the exhaust path upstream DPF 13. Each end of agglomerator 11 has a port, such that exhaust flows in one end, and out the other end.

Agglomerator 11 has two transducers 11a, one at each end of the agglomerator 11. Each transducer 11a generates standing waves along the length (longitudinal axis) in the interior of the agglomerator 11. Exhaust enters the agglomerator 11 from the side of one end of the agglomerator 11, and is redirected along the longitudinal axis of the agglomerator 11.

As exhaust flows through the agglomerator 11, fine particles agglomerate through an increased number of particle collisions. Particle growth results, and leads to shifting more of the finer size particles that would normally escape through the flowthrough DPF 13 and exit out the tailpipe 14 into the atmosphere.

More specifically, exposure of particulate-laden diesel exhaust to an ultrasonic wave field promotes particle agglomeration. Agglomerated particles are easier to trap in a flowthrough filtration device and therefore improve its trapping efficiency. Flowthrough DPF's have traditionally exhibited low engine back pressure characteristics and can maintain better engine performance and fuel economy. Applying ultrasonic waves upstream of a flowthrough DPF should maintain low engine exhaust back pressure, good engine performance, and fuel economy, while achieving high particulate filtration efficiency.

FIG. 2 illustrates the accumulation mode of a typical flowthrough DPF filter. As finer particles (nuclei range—smaller than 50 nm in equivalent aerodynamic diameter) grow, they move to the accumulation range particle size (greater than 50 nm in equivalent aerodynamic diameter). These larger size particles are intercepted and retained in the tortuous path of the DPF much more easily than smaller particles, thus improving the filtering efficiency.

FIG. 3 illustrates an example of possible results from the proposed exhaust treatment method, such as that illustrated in FIG. 1. It shows that the efficiency of a flowthrough DPF approaches that of a typical wallflow filter when SPA technology is applied.

The use of two transducers 11a, such as in the system of FIG. 1, adds flexibility in tuning the ultrasonic waves according to engine operating variables such as speed and load. To this end, the control signals for the transducers could be generated as part of a comprehensive engine control module. This added controllability can be used to optimize the power consumption supplied to each transducer 11a, thus reducing its burden on the vehicle electrical system and improving its overall efficiency. Referring to FIG. 1, a control unit could be appropriately programmed to tune or otherwise control the operation of the transducers, and could be a discrete dedicated unit or could be part of a larger engine control module. In other embodiments, only one or more than two transducers 11a could be used.

The invention claimed is:

1. A method for reducing particulate emissions from engine exhaust, comprising:
    Placing an acoustic generator on the exhaust line downstream the engine;
    Wherein the acoustic generator is tube-shaped having a top end, a bottom end, and a long wall, the acoustic generator further having a first transducer at the top end and a second transducer at the bottom end, the acoustic generator further having an entry port in its long wall near the bottom end for receiving engine exhaust and an exit port in its long wall near the top end for exhausting the engine exhaust;
    Placing a particulate filter proximate the exit port;
    generating mechanical waves in the exhaust line upstream the filter, such that the first transducer emits acoustic waves from the top end and the second transducer emits acoustic waves from the bottom end, thereby producing interfering standing waves along the length of the acoustic generator; and
    using the particulate filter to filter the engine exhaust.

2. The method of claim 1, wherein the acoustic waves are ultrasonic waves.

3. The method of claim 1, further comprising the step of using a control unit to control the transducers and to tune the waves to achieve various degrees of agglomeration of the particulates.

4. The method of claim 1, further comprising the step of controlling the power consumption of sonic particle agglomeration, by controlling the transducer output.

5. The method of claim 1, wherein the filter is a flowthrough filter.

6. The method of claim 1, further comprising the step of changing the output of one or both of the transducers in response to at least one engine operation variable.

7. The method of claim 6, wherein the engine operation variable is engine speed.

8. The method of claim 6, wherein the engine operation variable is engine load.

9. A system for reducing particulate emissions from engine exhaust in an exhaust line from an engine, comprising:
    a particulate filter to filter the particulates in the exhaust line;
    a mechanical wave generator in the exhaust line upstream the filter;
    wherein the generator is tube-shaped having a top end, a bottom end, and a long wall, the acoustic generator further having a first transducer at the top end and a second transducer at the bottom end, such that the transducers are configured to generate interfering standing waves along the length of the wave generator;
    Wherein the acoustic generator further has an entry port in its long wall near the bottom end for receiving engine exhaust, and has an exit port in its long wall near the top end for exhausting the engine exhaust; and
    a control unit operable to deliver control signals to the transducers.

10. The system of claim 9, wherein the transducers are ultrasonic transducers.

11. The system of claim 9, wherein the control unit is operable to control the power consumption of the wave generator.

12. The system of claim 9, wherein the filter is a flowthrough filter.

13. The system of claim 9, wherein the control unit is operable to tune the wave generator in response to engine operating variables.

14. The system of claim 13, wherein the control unit is programmed to receive engine speed data and to modify control signals to the transducers in response to the engine speed data.

15. The system of claim 13, wherein the control unit is programmed to receive engine load data and to modify control signals to the transducers in response to the engine load data.

* * * * *